US010948592B2

United States Patent
Matsuura et al.

(10) Patent No.: US 10,948,592 B2
(45) Date of Patent: Mar. 16, 2021

(54) OBSTACLE DETECTION APPARATUS FOR VEHICLES

(71) Applicants: DENSO CORPORATION, Kariya (JP); TOYOTA JIDOSHA KABUSHIKI KAISHA, Toyota (JP)

(72) Inventors: Mitsuyasu Matsuura, Nishio (JP); Tsuyoshi Ando, Kariya (JP); Takayuki Hiromitsu, Kariya (JP); Motonari Ohbayashi, Nagakute (JP); Hironobu Ishijima, Toyota (JP)

(73) Assignees: DENSO CORPORATION, Kariya (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 205 days.

(21) Appl. No.: 15/515,557

(22) PCT Filed: Oct. 21, 2015

(86) PCT No.: PCT/JP2015/005297
§ 371 (c)(1),
(2) Date: Mar. 29, 2017

(87) PCT Pub. No.: WO2016/063526
PCT Pub. Date: Apr. 28, 2016

(65) Prior Publication Data
US 2017/0219702 A1 Aug. 3, 2017

(30) Foreign Application Priority Data

Oct. 22, 2014 (JP) .............................. JP2014-215722

(51) Int. Cl.
*G01S 15/00* (2020.01)
*G01S 15/46* (2006.01)
(Continued)

(52) U.S. Cl.
CPC ............ *G01S 15/46* (2013.01); *G01S 15/878* (2013.01); *G01S 15/931* (2013.01); *G01S 7/56* (2013.01); *G01S 2015/938* (2013.01)

(58) Field of Classification Search
None
See application file for complete search history.

(56) References Cited

U.S. PATENT DOCUMENTS 4,187,487 A * 2/1980 Numata ................... G01S 15/50
367/93
4,694,296 A * 9/1987 Sasaki ..................... B60Q 1/525
340/435

(Continued)

FOREIGN PATENT DOCUMENTS

EP 2251710 A2 * 11/2010 ............ G01S 7/524
EP 2696215 A2 2/2014
(Continued)

*Primary Examiner* — James R Hulka
*Assistant Examiner* — Jonathan D Armstrong
(74) *Attorney, Agent, or Firm* — Maschoff Brennan

(57) ABSTRACT

An obstacle detection apparatus for vehicles includes: a first probe wave sensor detecting a direct wave distance as a distance to an obstacle by transmitting a probe wave and receiving a reflection wave of the probe wave reflected by the obstacle; a second probe wave sensor receiving the reflection wave to detect an indirect wave distance as a distance to the obstacle by receiving the reflection wave; an approach determinator determining whether the obstacle is present between the first probe wave sensor and the second probe wave sensor and whether the obstacle is approaching the vehicle; and a distance determinator determining an obstacle distance to be less than or equal to a predetermined distance range when the indirect wave distance falls out of the distance range as the obstacle is present between the first probe wave sensor and the second probe wave sensor and the obstacle is approaching the vehicle.

12 Claims, 10 Drawing Sheets

(51) Int. Cl.
*G01S 15/87* (2006.01)
*G01S 15/931* (2020.01)
*G01S 7/56* (2006.01)

(56) References Cited

U.S. PATENT DOCUMENTS

| | | | | |
|---|---|---|---|---|
| 4,868,796 A | * | 9/1989 | Ahrens | B65F 3/04 367/96 |
| 4,910,512 A | * | 3/1990 | Riedel | G01H 3/005 340/901 |
| 5,689,250 A | * | 11/1997 | Kremser | G01S 7/527 340/435 |
| 5,764,136 A | * | 6/1998 | Harron | B60Q 1/52 340/435 |
| 5,869,764 A | * | 2/1999 | Schulte | B60Q 9/006 367/140 |
| 5,980,048 A | * | 11/1999 | Rannells, Jr. | B60R 1/025 180/167 |
| 6,128,576 A | | 10/2000 | Nishimoto et al. | |
| 6,152,238 A | * | 11/2000 | Ferrell | E02F 3/847 172/2 |
| 2003/0128153 A1 | * | 7/2003 | Paradie | G01S 7/412 342/70 |
| 2004/0088079 A1 | * | 5/2004 | Lavarec | G01S 17/026 700/258 |
| 2004/0128075 A1 | * | 7/2004 | Besserer | G01S 15/46 702/16 |
| 2005/0088334 A1 | * | 4/2005 | Herder | G01S 7/527 342/70 |
| 2005/0122234 A1 | * | 6/2005 | Danz | B60Q 9/007 340/932.2 |
| 2005/0154530 A1 | * | 7/2005 | Hosokawa | B60R 21/013 701/301 |
| 2005/0285758 A1 | * | 12/2005 | Matsukawa | B60W 10/06 340/932.2 |
| 2006/0259213 A1 | * | 11/2006 | Hashimoto | G01S 15/74 701/23 |
| 2007/0008819 A1 | * | 1/2007 | Diessner | G01S 7/52004 367/99 |
| 2007/0024431 A1 | * | 2/2007 | Touge | B60Q 9/00 340/436 |
| 2007/0182587 A1 | * | 8/2007 | Danz | G01S 13/931 340/903 |
| 2007/0297288 A1 | * | 12/2007 | Boecker | B60W 30/16 367/96 |
| 2009/0071255 A1 | * | 3/2009 | Okuda | G01S 7/52004 73/628 |
| 2010/0067324 A1 | * | 3/2010 | Preissler | G01S 7/52004 367/13 |
| 2010/0228482 A1 | * | 9/2010 | Yonak | G01S 3/8083 701/301 |
| 2010/0245065 A1 | * | 9/2010 | Harada | G01S 7/529 340/435 |
| 2010/0329510 A1 | * | 12/2010 | Schmid | B62D 15/0275 382/103 |
| 2011/0022269 A1 | * | 1/2011 | Nakazono | G08G 1/14 701/41 |
| 2011/0057814 A1 | * | 3/2011 | Park | B60W 10/18 340/932.2 |
| 2012/0026836 A1 | * | 2/2012 | Scripca | G01S 15/18 367/99 |
| 2012/0120768 A1 | * | 5/2012 | Horsky | G01S 7/536 367/93 |
| 2012/0327239 A1 | * | 12/2012 | Inoue | B60R 1/00 348/148 |
| 2013/0028053 A1 | | 1/2013 | Tsuji et al. | |
| 2013/0098700 A1 | * | 4/2013 | Zhang | G05D 1/0255 180/167 |
| 2013/0128699 A1 | * | 5/2013 | Schmid | G01S 15/42 367/99 |
| 2013/0162461 A1 | * | 6/2013 | Lucking | G01S 15/878 342/70 |
| 2014/0118170 A1 | * | 5/2014 | Rozgonyi | G08G 1/04 340/943 |
| 2015/0160658 A1 | * | 6/2015 | Reedman | G05D 1/102 701/3 |
| 2015/0307091 A1 | * | 10/2015 | Gokan | G01S 15/931 701/70 |
| 2016/0063861 A1 | * | 3/2016 | Lee | G08G 1/14 340/932.2 |
| 2016/0116583 A1 | * | 4/2016 | Fukuman | G01S 15/931 342/59 |
| 2016/0291153 A1 | * | 10/2016 | Mossau | G01S 15/931 |
| 2016/0380488 A1 | * | 12/2016 | Widmer | H04B 5/0037 324/207.15 |
| 2017/0031031 A1 | * | 2/2017 | Wagner | G01C 23/00 |
| 2017/0197616 A1 | * | 7/2017 | Ichikawa | G01S 7/524 |

FOREIGN PATENT DOCUMENTS

| | | | | |
|---|---|---|---|---|
| GB | 2496296 A | * | 5/2013 | G01S 15/107 |
| JP | S64-044879 A | | 2/1989 | |
| JP | 2000-187075 A | | 7/2000 | |
| JP | 2002323560 A | * | 11/2002 | |
| JP | 3550322 A | | 8/2004 | |

* cited by examiner

OBSTACLE DETECTION APPARATUS FOR VEHICLES

CROSS REFERENCE TO RELATED APPLICATION

This application is based on Japanese Patent Application No. 2014-215722 filed on Oct. 22, 2014, the disclosure of which is incorporated herein by reference.

TECHNICAL FIELD

The present disclosure relates to an obstacle detection apparatus for vehicles that detects an obstacle by transmitting and receiving a probe wave.

BACKGROUND ART

An obstacle detection apparatus for vehicles that detects an obstacle by transmitting and receiving a probe wave may include a plurality of probe wave sensors disposed in several different parts of the vehicle. In Patent Literature 1, a plurality of ultrasonic sensors are provided that transmit an ultrasonic wave as a probe wave. Each ultrasonic sensor detects the distance to an obstacle, and when the distance becomes a preset value or lower, a notifier notifies the direction in which the obstacle is located. When a sensor on the front right of the vehicle alone detects an obstacle, the controller that controls the notifier illuminates an indicator that indicates front right.

When the obstacle is out of a probe wave irradiation range of the probe wave sensor, the obstacle cannot be detected. Therefore, it is desirable to dispose a plurality of probe wave sensors such that there will be no gaps between adjacent probe wave irradiation ranges of the probe wave sensors.

Sometimes, however, probe wave sensors may be arranged such that there are gaps between the probe wave irradiation ranges adjacent each other, due to design restrictions or limitations on the places where installation space can be secured. There tend to be such gaps near a sensor placement surface where the probe wave sensors are disposed. This is because a probe wave is irradiated from the sensor placement surface in a direction away from the sensor placement surface, and not in a direction along the sensor placement surface.

The nearer the obstacle is to the vehicle, the higher the necessity is of determining the distance to the obstacle. Therefore, it is desirable that the distance to the object be determinable even when the obstacle is present in a gap between probe wave irradiation ranges near the sensor placement surface.

PRIOR ART LITERATURES

Patent Literature

Patent Literature 1: JP 3550322 B2

SUMMARY OF INVENTION

It is an object of the present disclosure to provide an obstacle detection apparatus for vehicles capable of determining the distance to an obstacle even when the obstacle is present in a gap between probe wave irradiation ranges near the sensor placement surface.

According to an aspect of the present disclosure, an obstacle detection apparatus for vehicles is mounted to a vehicle and includes: a first probe wave sensor that is arranged at a predetermined part of the vehicle to detect a direct wave distance as a distance to an obstacle by transmitting a probe wave and receiving a reflection wave of the probe wave reflected by the obstacle; a second probe wave sensor that is arranged at a position of the vehicle where the second probe wave sensor receives the reflection wave to detect an indirect wave distance as a distance to the obstacle by receiving the reflection wave; an approach determinator that determines, based on the indirect wave distance, whether the obstacle is present between the first probe wave sensor and the second probe wave sensor and whether the obstacle is approaching the vehicle; and a distance determinator that determines an obstacle distance for driver assistance control to be less than or equal to a predetermined distance range when the indirect wave distance falls out of the distance range, in a case where the approach determinator determines that the obstacle is present between the first probe wave sensor and the second probe wave sensor and the obstacle is approaching the vehicle.

In one aspect of the present disclosure, it is determined, based on an indirect wave distance, whether an obstacle is present between a first probe wave sensor and a second probe wave sensor, and whether it is approaching the vehicle. Indirect waves are very likely being reflected by the obstacle between the first probe wave sensor and the second probe wave sensor. Therefore, it is possible, with the use of the indirect wave distance, to accurately determine whether the obstacle is between the first probe wave sensor and the second probe wave sensor, and whether it is approaching the vehicle.

Provided that the obstacle is between the first probe wave sensor and the second probe wave sensor and the obstacle is approaching the vehicle. If the obstacle becomes undetectable, it can be assumed that the obstacle has moved into a gap between the probe wave irradiation ranges of the first probe wave sensor and second probe wave sensor.

If the obstacle is approaching the vehicle, the indirect wave distance cannot become longer than the previously determined distance. Therefore, provided that the obstacle is between the first probe wave sensor and the second probe wave sensor and approaching the vehicle, if the indirect wave distance becomes longer than a predetermined distance range, it can be determined that the obstacle that was detectable before has moved into the gap between the probe wave irradiation ranges of the first probe wave sensor and second probe wave sensor and now is undetectable, and that another obstacle is now being detected.

Therefore, provided that the approach determinator has determined that the obstacle is between the first probe wave sensor and the second probe wave sensor and approaching the vehicle, the distance determinator determines an obstacle distance to be not more than a predetermined distance range even when the indirect wave distance falls out of this predetermined distance range. This way, the distance to the obstacle can be determined even when the obstacle is present in a gap between probe wave irradiation ranges near the sensor placement surface.

BRIEF DESCRIPTION OF DRAWINGS

The above and other objects, features and advantages of the present disclosure will become more apparent from the following detailed description made with reference to the accompanying drawings. In the drawings.

EMBODIMENTS FOR CARRYING OUT INVENTION

Figure 1:
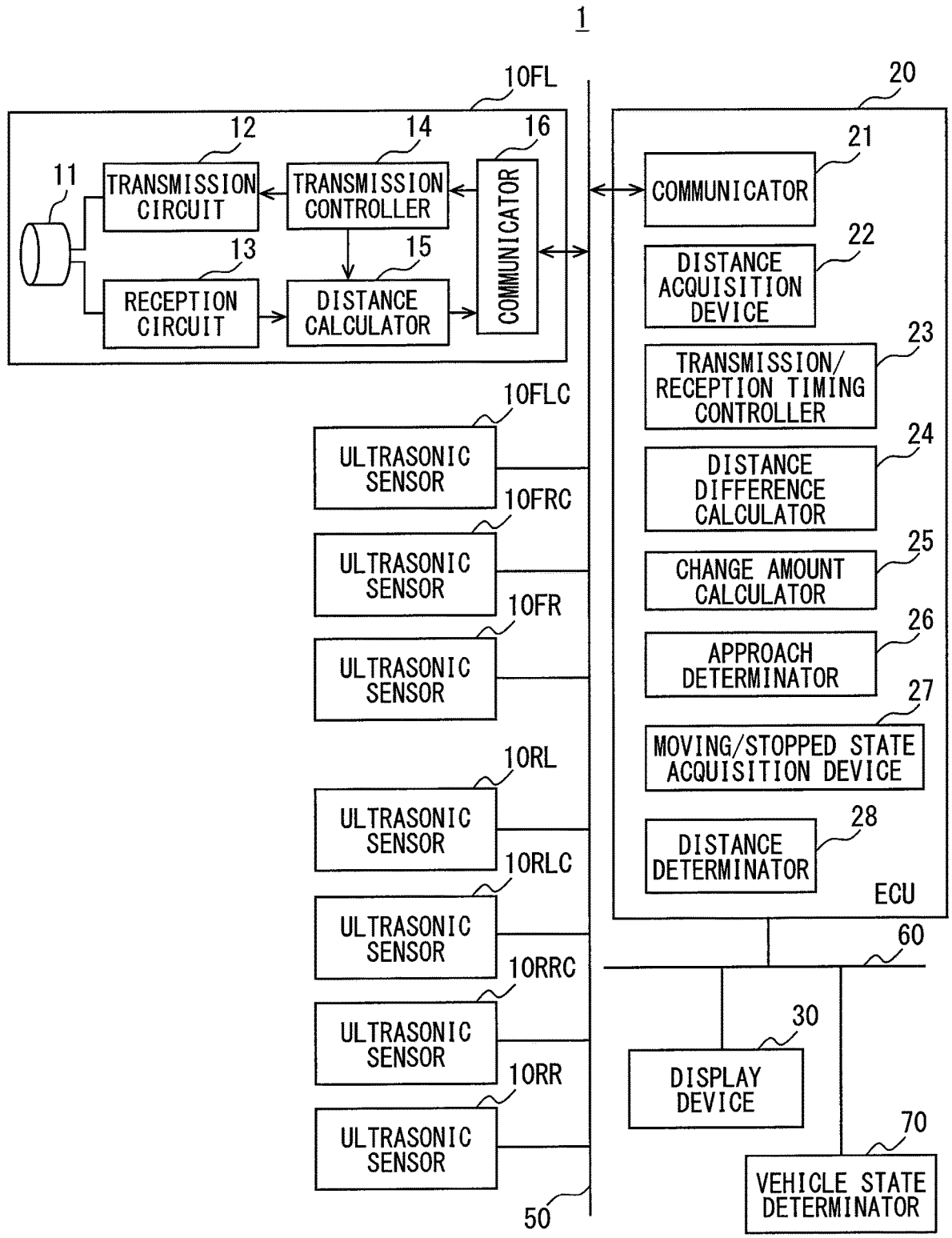
FIG. 1 is a configuration diagram showing an obstacle detection apparatus for vehicles of one embodiment.
Figure 2:
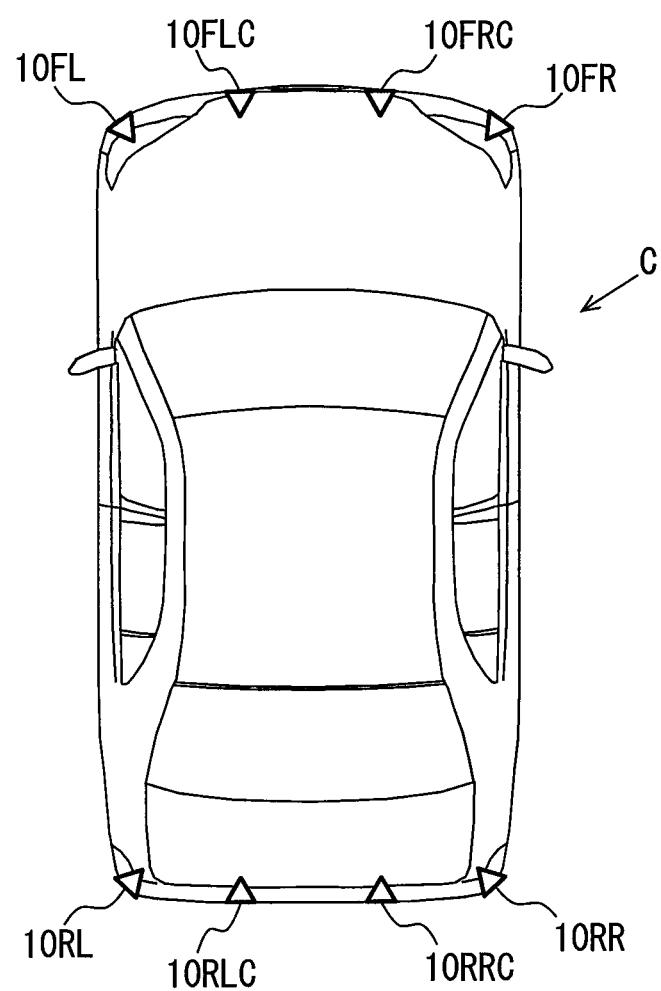
FIG. 2 is a diagram showing positions where ultrasonic sensors are attached.

An embodiment of the present disclosure will be hereinafter described with reference to the drawings. An obstacle detection apparatus for vehicles 1 shown in FIG. 1 includes an ultrasonic sensor 10, an ECU 20, and a display device 30. The ultrasonic sensor 10 corresponds to the probe wave sensor. Eight ultrasonic sensors 10 are provided. These eight ultrasonic sensors 10 are arranged at a front end face and a rear end face of a vehicle C as shown in FIG. 2, four each on either end.

More specifically, ultrasonic sensors 10FL, 10FLC, 10FRC, and 10FR are arranged at the front end face of the vehicle C, at the left corner, on the left side in the center part, on the right side in the center part, and at the right corner, respectively. Ultrasonic sensors 10RL, 10RLC, 10RRC, and 10RR are arranged at the rear end face of the vehicle C, at the left corner, on the left side in the center part, on the right side in the center part, and at the right corner, respectively. When it is not particularly necessary to distinguish these eight ultrasonic sensors 10FL, 10FLC, 10FRC, 10FR, 10RL, 10RLC, 10RRC, and 10RR, the ultrasonic sensors 10FL, 10FLC, 10FRC, 10FR, 10RL, 10RLC, 10RRC, and 10RR will be referred to simply as ultrasonic sensor 10. The front end face and rear end face of the vehicle C each constitute a sensor placement surface.

(Configuration of Ultrasonic Sensor 10)

The ultrasonic sensor 10 includes a transceiver 11, a transmission circuit 12, a reception circuit 13, a transmission controller 14, a distance calculator 15, and a communicator 16.

The transceiver 11 generates a wave that is an ultrasonic wave and transmits this wave, as well as receives an ultrasonic wave coming from outside. The transceiver then outputs a signal indicative of the intensity of the received ultrasonic wave to the reception circuit 13. The ultrasonic waves received by the transceiver 11 include a reflection wave originating from a transmission wave reflected by an object outside.

The transmission circuit 12 generates a pulse signal when a transmission instruction signal is input from the transmission controller 14, and outputs this pulse signal to the transceiver 11. The transceiver 11 is activated by this pulse signal and transmits waves in pulses.

The reception circuit 13 amplifies and performs A/D conversion on the signal input from the transceiver 11, and outputs a signal after the amplification and A/D conversion (hereinafter, reflection wave signal) to the distance calculator 15.

The transmission controller 14 outputs a transmission instruction signal to the transmission circuit 12 when the transmission controller 14 acquires the transmission instruction signal transmitted from the ECU 20 from the communicator 16. The transmission controller 14 also notifies the distance calculator 15 that the transmission controller 14 has output the transmission instruction signal. The transmission controller 14 may also acquire a reception instruction signal from the ECU 20. The reception instruction signal is a signal that causes reception only to be performed without the transmission of a wave. At this time, an adjacent ultrasonic sensor 10 is transmitting a wave. The transmission controller 14 also notifies the distance calculator 15 of the acquisition of the reception instruction signal when the transmission controller 14 acquires the reception instruction signal.

The distance calculator 15 calculates a distance to an object from a time interval from when the transceiver 11 in the same ultrasonic sensor 10 as this distance calculator 15, or the transceiver 11 of an adjacent ultrasonic sensor 10, transmits a wave to when a reflection wave is received with an intensity of not less than an object detection threshold.

The time point when the transceiver 11 transmits a wave is the time point when it receives a notification from the transmission controller 14 that a transmission instruction signal has been output, or a reception instruction signal has been acquired. The time point when a reflection wave is received with an intensity of not less than an object detection threshold is the time point when the reflection wave signal exceeds the object detection threshold for the first time during a reflection wave detection period that starts after a predetermined time from the transmission of a wave. This time interval multiplied by the speed of sound and divided by two is the distance to the object. The distance determined by the distance calculator 15 will be hereinafter referred to as detected distance.

The upper limit of the detected distance is several meters or more. The intensity of the wave the transceiver 11 transmits, and the gain of the reception circuit 13 are set such that an obstacle positioned at the upper limit of the detected distance can be detected. When the upper limit of the detected distance is set to several meters or more, the space between the ultrasonic sensors 10 adjacent each other on the front end face and rear end face is shorter than the upper limit of the detected distance. Therefore, each ultrasonic sensor 10 is capable of receiving a reflection wave of a wave transmitted from an adjacent ultrasonic sensor 10 and reflected by an obstacle, i.e., an indirect wave.

The two ultrasonic sensors 10FLC and 10FRC in the central part are too spaced apart to detect an obstacle present in a short distance range, either with a direct wave or an indirect wave, if the obstacle is positioned at the same distance from both ultrasonic sensors 10FLC and 10FRC. For example, the distance between the ultrasonic sensors 10FLC and 10FRC is 60 to 100 cm. In the present embodiment, the presence of an obstacle in the short distance range between the two ultrasonic sensors 10FLC and 10FRC in the central part is assumed by the process in FIG. 6.

The communicator 16 transmits the detected distance determined by the distance calculator 15 to a communicator 21 of the ECU 20 via a LIN bus 50. The communicator 16 receives transmission instruction signals and reception instruction signals transmitted from the communicator 21 of the ECU 20, and outputs the transmission instruction signals and reception instruction signals to the transmission controller 14.

(Configuration of ECU20)

The ECU 20 includes a communicator 21, a distance acquisition device 22, a transmission/reception timing controller 23, a distance difference calculator 24, a change amount calculator 25, an approach determinator 26, a moving/stopped state acquisition device 27, and a distance determinator 28. This ECU 20 is a known circuit configuration that includes a CPU, ROM, RAM, I/O interface, and the like. The CPU executes programs stored in the ROM so that the ECU 20 functions as the distance acquisition device 22, transmission/reception timing controller 23, distance difference calculator 24, change amount calculator 25, approach determinator 26, moving/stopped state acquisition device 27, and distance determinator 28. Some or all of the functions executed by the ECU 20 may be configured as hardware with one or a plurality of ICs or the like.

The communicator 21 is a communication interface and communicates with the ultrasonic sensor 10 via the LIN bus 50. The ECU 20 is also connected to the display device 30 and a vehicle state determinator 70 via an in-vehicle LAN 60.

The processes performed by the distance acquisition device 22, transmission/reception timing controller 23, distance difference calculator 24, change amount calculator 25, approach determinator 26, moving/stopped state acquisition device 27, and distance determinator 28 will be described later with reference to FIG. 4 to FIG. 6.

(Display Device 30)

Figure 7:
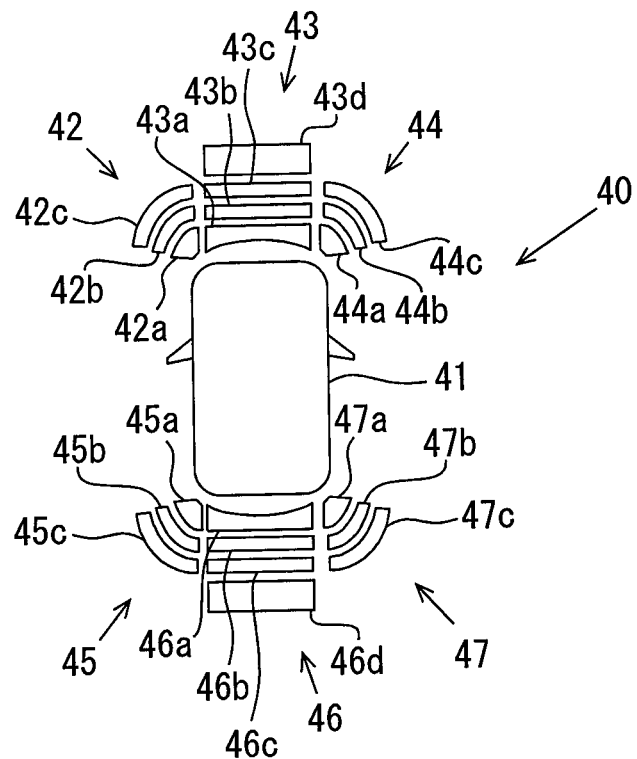
FIG. 7 is a diagram showing an obstacle position notification image.

The display device 30 is arranged at a position in the interior of the vehicle C where the display device is visible from the driver, and displays an obstacle position notification image 40 shown in FIG. 7. This obstacle position notification image 40 includes a figure of a vehicle 41 representing the vehicle C in the center. A left front notification area graphic 42, a center front notification area graphic 43, a right front notification area graphic 44, a left rear notification area graphic 45, a center rear notification area graphic 46, and a right rear notification area graphic 47 are arranged around the figure of the vehicle 41.

One or a plurality of these notification area graphics 42 to 47 corresponding to the direction and position of a detected obstacle is (are) illuminated to notify a passenger of the vehicle C of the direction and position where the obstacle was detected.

The left front notification area graphic 42 includes a short distance notification graphic 42a, a middle distance notification graphic 42b, and a long distance notification graphic 42c arranged in increasing distance from the figure of the vehicle 41. The notification area graphics 44, 45, and 47 corresponding to other corners similarly include short distance notification graphics 44a, 45a, and 47a, middle distance notification graphics 44b, 45b, and 47b, and long distance notification graphics 44c, 45c, and 47c.

The center front notification area graphic 43 and center rear notification area graphic 46 include short distance notification graphics 43a, and 46a, middle distance notification graphics 43b and 46b, long distance notification graphics 43c and 46c, and longest distance notification graphics 43d and 46d arranged in increasing distance from the figure of the vehicle 41. These distance notification graphics are selectively illuminated to indicate the distance to the obstacle.

(Vehicle State Determinator 70)

The vehicle state determinator 70 sequentially determines the moving/stopped state of the vehicle C, i.e., whether it is in a moving state or in a stopped state. For the determination of the moving/stopped state, vehicle speed detected by a vehicle speed sensor is used, for example. Alternatively, the moving/stopped state may be determined with the use of a degree of acceleration detected by an acceleration sensor provided to the vehicle C, or a measurement of a wheel speed sensor.

(Process Executed by Ultrasonic Sensor 10)

Figure 3:
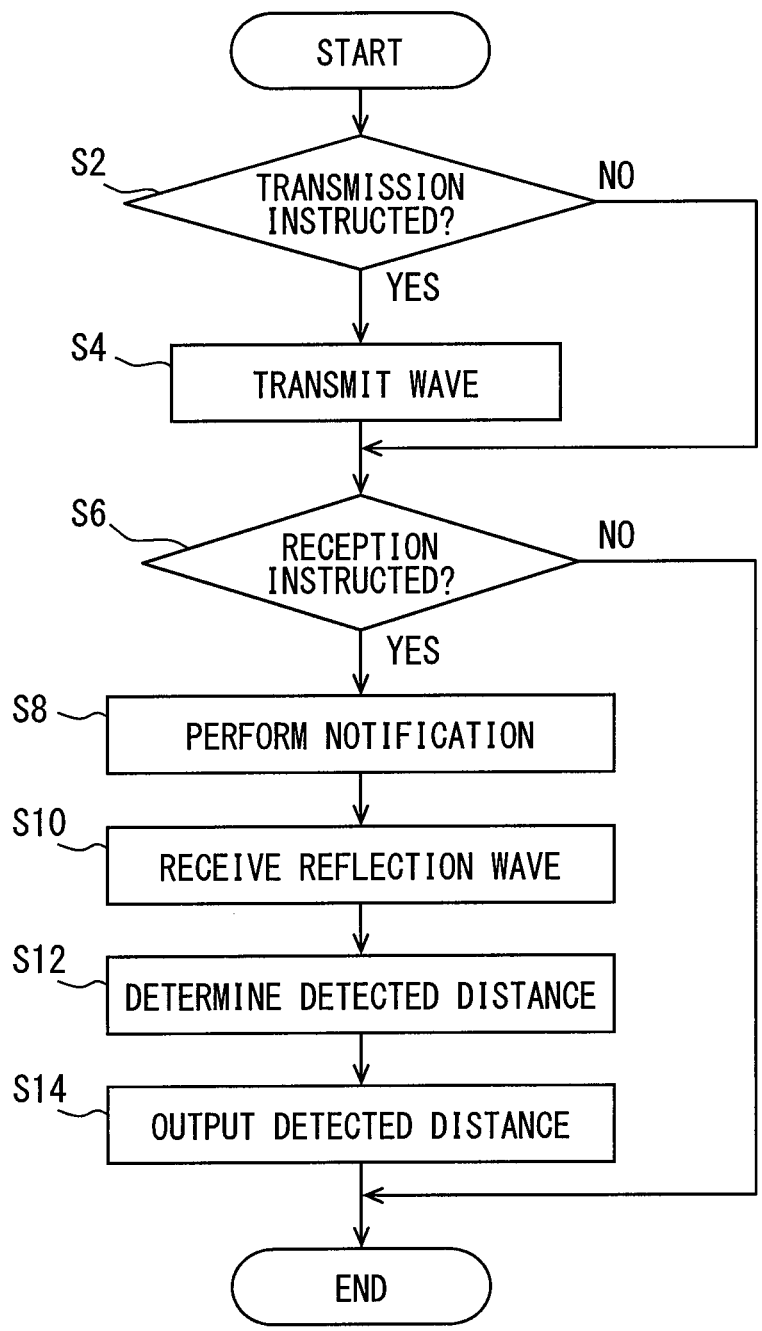
FIG. 3 is a flowchart showing a process executed by an ultrasonic sensor.

Next, the flow of the process executed by each ultrasonic sensor 10 will be described with reference to FIG. 3. The ultrasonic sensor 10 executes this process shown in FIG. 3 repeatedly, for example, during power application. In FIG. 3, steps S2 to S8 are performed by the transmission controller 14, step S10 is performed by the reception circuit 13, and steps S12 and S14 are performed by the distance calculator 15.

At step S2, it is determined whether a transmission instruction signal output by the transmission/reception timing controller 23 of the ECU 20 has been acquired via the communicator 16. If this determination is NO, the process goes to step S6, whereas, if YES, the process goes to step S4.

At step S4, a wave is transmitted from the transceiver 11. Namely, a transmission instruction signal is output to the transmission circuit 12. When a transmission instruction signal is input, the transmission circuit 12 generates a pulse signal, and outputs this pulse signal to the transceiver 11. Thus waves are transmitted in pulses from the transceiver 11.

At step S6, it is determined whether a reception instruction signal has been acquired. Since the reception instruction signal is always transmitted with the transmission instruction signal, the reception instruction signal need not necessarily be transmitted, and the ECU 20 may interpret the transmission instruction signal as the reception instruction signal to make the determination at step S6 and other decisions.

If the determination at step S6 is NO, the process in FIG. 3 is ended, whereas, if YES, the process goes to step S8. At step S8, the distance calculator 15 is notified that a transmission instruction signal or a reception instruction signal has been acquired.

At step S10, ultrasonic waves are received for a certain period of time. At step S12, the time interval from when a wave was transmitted to when the intensity of a reflection wave exceeded an object detection threshold is determined, and this time interval is multiplied by the speed of sound and divided by two, to produce a detected distance. If a reflection wave with an intensity of not less than the object detection threshold is not detected, the detected distance is not produced. At step S14, if a detected distance has been obtained at step S12, this detected distance is output to the ECU 20.

(Process Executed by ECU 20)

Next, the flow of the process executed by the ECU 20 will be described with reference to FIG. 4. This process shown in FIG. 4 is executed repeatedly when an obstacle detection condition is established. The obstacle detection condition is, for example, a condition that the ignition is on, and the vehicle speed is less than a certain value. The certain value of vehicle speed is 30 km/h, for example.

Figure 4:
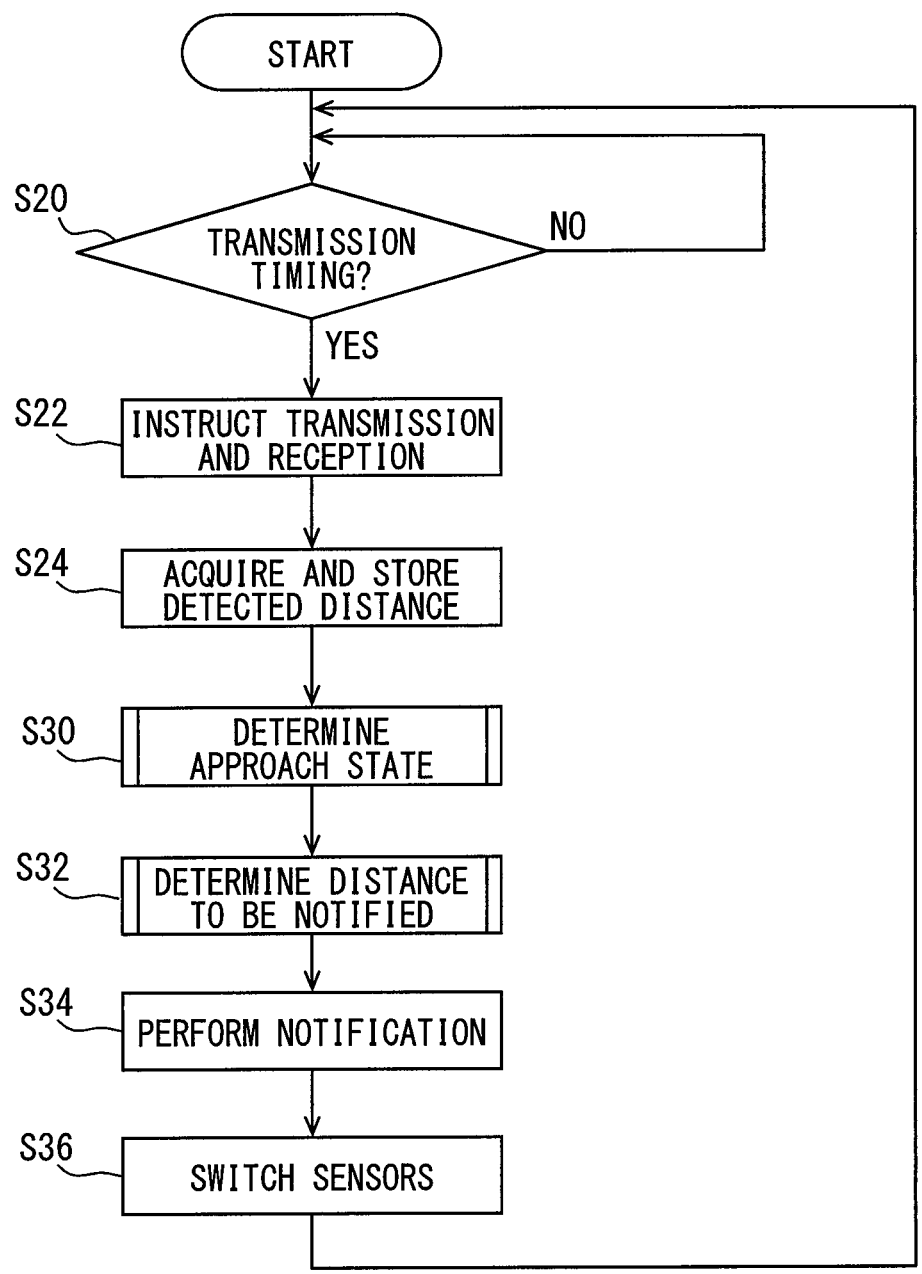
FIG. 4 is a flowchart showing a process executed by an ECU.

In the process of FIG. 4, steps S20, S22, and S36 are executed by the transmission/reception timing controller 23, and step S24 is executed by the distance acquisition device 22. The execution entities of steps S30 and S32 will be described with reference to FIG. 5 and FIG. 6. Step S34 is executed by the distance determinator.

At step S20, it is determined whether the transmission timing at which a wave is to be transmitted from one of the ultrasonic sensors 10 has been arrived at. In the present embodiment, the transmission timing for the ultrasonic sensors 10FL, 10FLC, 10FRC, and 10FR disposed on the front end face of the vehicle C is controlled separately from the transmission timing for the ultrasonic sensors 10RL, 10RLC, 10RRC, and 10RR disposed on the rear end face. Therefore, whether the transmission timing has been arrived at in the ultrasonic sensors 10FL, 10FLC, 10FRC, and 10FR on the front end face, and whether the transmission timing has been arrived at in the ultrasonic sensors 10RL, 10RLC, 10RRC, and 10RR on the rear end face, are determined separately. The process from steps S22 to S26 is also performed separately for the ultrasonic sensors 10FL, 10FLC, 10FRC, and 10FR on the front end face, and for the ultrasonic sensors 10RL, 10RLC, 10RRC, and 10RR on the rear end face.

The transmission timing is determined based on the transmission/reception period of each ultrasonic sensor 10. The transmission/reception period of one ultrasonic sensor 10 is a preset period of, for example, several tens msec to several hundreds msec. If the determination at step S20 is NO, step S20 is executed repeatedly, whereas, if YES, the process goes to step S22.

At step S22, a transmission instruction signal and a reception instruction signal are output to the ultrasonic sensor 10. More specifically, a transmission instruction signal and a reception instruction signal are output to an ultrasonic sensor 10 where the transmission timing has been arrived at. A reception instruction signal is output to ultrasonic sensor(s) 10 adjacent to the ultrasonic sensor 10 where the transmission timing has been arrived at.

Therefore, if the transmission timing has been arrived at in the ultrasonic sensor 10FL at the left front corner, a transmission instruction signal and a reception instruction signal are transmitted to the ultrasonic sensor 10FL at the left front corner, while a reception instruction signal is transmitted to the ultrasonic sensor 10FLC on the left in the front central part.

If the transmission timing has been arrived at in the ultrasonic sensor 10FLC on the left in the front central part, a transmission instruction signal and a reception instruction signal are transmitted to this ultrasonic sensor 10FLC. A reception instruction signal is transmitted to the ultrasonic sensor 10FL at the left front corner, and to the ultrasonic sensor 10FRC on the right side in the front central part.

At step S24 that follows, if the ultrasonic sensor 10 to which the reception instruction signal was output has produced a detected distance, this detected distance is acquired. The detected distance acquired from the ultrasonic sensor 10 to which the transmission instruction signal was transmitted is a detected distance determined from a direct wave. On the other hand, the detected distance acquired from the ultrasonic sensor 10 to which only the reception instruction signal was transmitted is a detected distance determined from an indirect wave.

At step S30, an approach state is determined. The approach state is determined for every notification area. The notification areas are six areas corresponding to the six notification area graphics 42 to 47.

Figure 5:
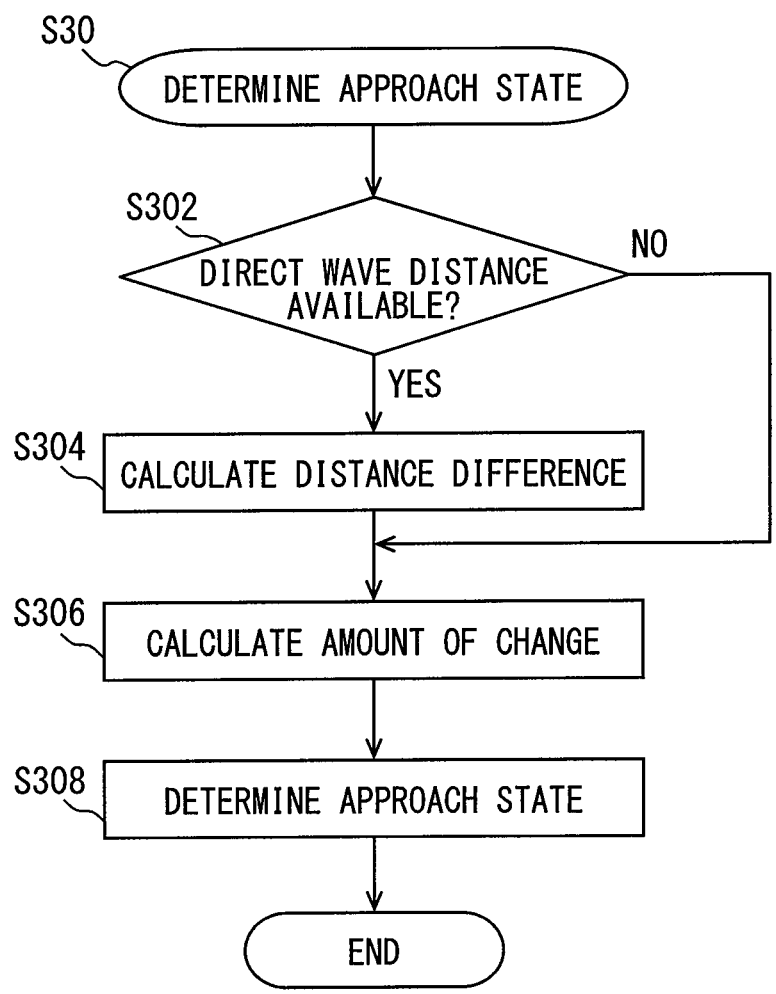
FIG. 5 is a flowchart showing a process in FIG. 4 of determining an approach state in detail.

This process of step S30 is illustrated in FIG. 5 in detail. In FIG. 5, steps S302 and S308 are executed by the approach determinator 26, step S304 is executed by the distance difference calculator 24, and step S306 is executed by the change amount calculator 25.

At step S302, it is determined whether a direct wave distance has been acquired. The direct wave distance is a detected distance calculated from a direct wave by an ultrasonic sensor 10 corresponding to the notification area for which this approach state determination process is to be performed (hereinafter, "corresponding ultrasonic sensor"). For example, the ultrasonic sensors 10FLC and 10FRC correspond to the center front notification area. If the determination at step S302 is NO, step S304 is not executed, and the process goes to step S306. The determination at this step would be NO if, for example, there is a gap between a direct wave detection range in which the ultrasonic sensor 10 can detect an obstacle with a direct wave, and a direct wave detection range of another ultrasonic sensor 10 adjacent to that ultrasonic sensor 10, and the obstacle is present in this gap.

If the determination at step S302 is YES, the process goes to step S304. At step S304, the difference between a direct wave distance and an indirect wave distance is calculated. The indirect wave distance is a detected distance calculated by an ultrasonic sensor 10 adjacent to the corresponding ultrasonic sensor by receiving an indirect wave originating from a wave transmitted by the corresponding ultrasonic sensor. The direct wave distance and indirect wave distance, which are both detected distances, are calculated by multiplying the time interval by the speed of sound and dividing the product by two.

Figure 8:
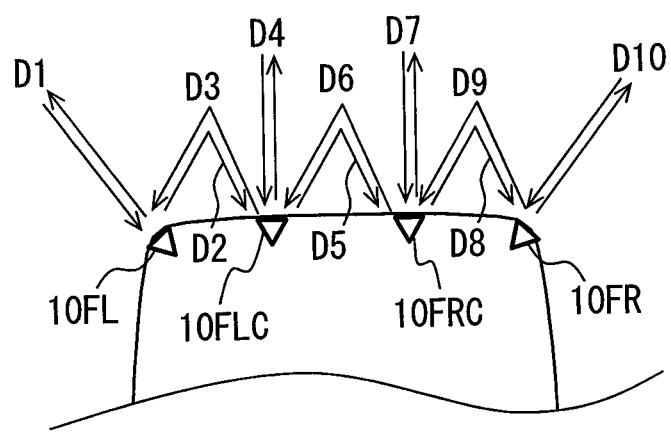
FIG. 8 is a diagram showing direct wave distances and indirect wave distances.

The direct wave distance and indirect wave distance will be explained more specifically with reference to FIG. 8. In FIG. 8, D1, D4, D7, and D10 are direct wave distances respectively calculated by the ultrasonic sensors 10FL, 10FLC, 10FRC, and 10FR. D2 and D3 are indirect wave distances calculated from an ultrasonic wave transmitted and received between the ultrasonic sensors 10FL and 10FLC. D5 and D6 are indirect wave distances calculated from an ultrasonic wave transmitted and received between the ultrasonic sensors 10FLC and 10FRC, and D8 and D9 are indirect wave distances calculated from an ultrasonic wave transmitted and received between the ultrasonic sensors 10FRC and 10FR.

A specific example of a distance difference will be explained. Direct wave distances corresponding to the center front notification area are D4 and D7. The corresponding ultrasonic sensors for the center front notification area are ultrasonic sensors 10FLC and 10FRC. Indirect wave distances associated with the ultrasonic sensors 10FLC and 10FRC are D5 and D6.

Therefore, the center front notification area has the following two distance differences (1) and (2). Namely, (1) D5 (or D6)–D4, and (2) D5 (or D6)–D7. As indicated in parenthesis, D6 may be used instead of D5. One of these distance differences (1) and (2), where the direct wave distance and indirect wave distance are both available, is calculated. At step S306 that follows, an amount of change in indirect wave distance is calculated. This amount of change is a difference between a calculated indirect wave distance that has been stored when it assumed a value not more than a predetermined distance, for example, a value classified as a long distance to be described later, and the current indirect wave distance.

At step S308 that follows, the approach state of the obstacle for which the change amount has been calculated at step S306 is determined. The approach state is whether the obstacle is approaching toward the vehicle C between the two ultrasonic sensors 10 associated with the indirect wave distance.

Therefore, the approach state is determined based on the following first and second conditions. The first condition is a condition of determining whether the obstacle is between the two ultrasonic sensors 10 associated with the indirect wave distance. This first condition is a condition that the distance difference is not more than a threshold that is defined from the distance to the obstacle, or that a direct wave distance has not been calculated while an indirect wave distance has been calculated.

This threshold defined from the distance to the obstacle is a maximum value of the difference in the lengths of two sides other than the base of a triangle where the distance between the two ultrasonic sensors 10 associated with the indirect wave distance is the base and the position of the obstacle is the vertex, when the obstacle is located in a predetermined range between the two ultrasonic sensors 10. The two sides other than the base of this triangle respectively correspond to the direct wave distance and the indirect wave distance, so that the difference in the lengths of two sides other than the base of the triangle is the difference between the direct wave distance and the indirect wave distance, i.e., the distance difference. Therefore, assuming that the obstacle is between the two ultrasonic sensors 10, if the distance difference is not more than the threshold that is the maximum value of the difference in the lengths of two sides other than the base, it means that the obstacle is indeed between the two ultrasonic sensors 10.

Other than the condition of whether the distance difference is not more than the threshold that is defined from the distance to the obstacle, the first condition includes another condition that a direct wave distance has not been calculated while an indirect wave distance has been calculated, for the following reason. As explained with regard to step S302, even when the obstacle is between two ultrasonic sensors 10, if there is a gap between the direct wave detection ranges of the two ultrasonic sensors 10, no direct wave can be detected. This first condition is established either if the distance difference is not more than a threshold that is defined from the distance to the obstacle, or if a direct wave distance has not been calculated while an indirect wave distance has been calculated.

The second condition is that the amount of change is less than 0. This second condition is a condition for determining whether the obstacle is approaching the vehicle C.

If the first condition and second condition are both satisfied, the approach state is established, wherein the obstacle is approaching between the two ultrasonic sensors 10 associated with the indirect wave distance.

After the steps of FIG. 5 have been executed, the process goes back to step S32 of FIG. 4. At step S32, a distance to be notified is determined for each notification area. The distance to be notified corresponds to the obstacle distance. This process of step S32 is illustrated in FIG. 6 in detail.

Figure 6:
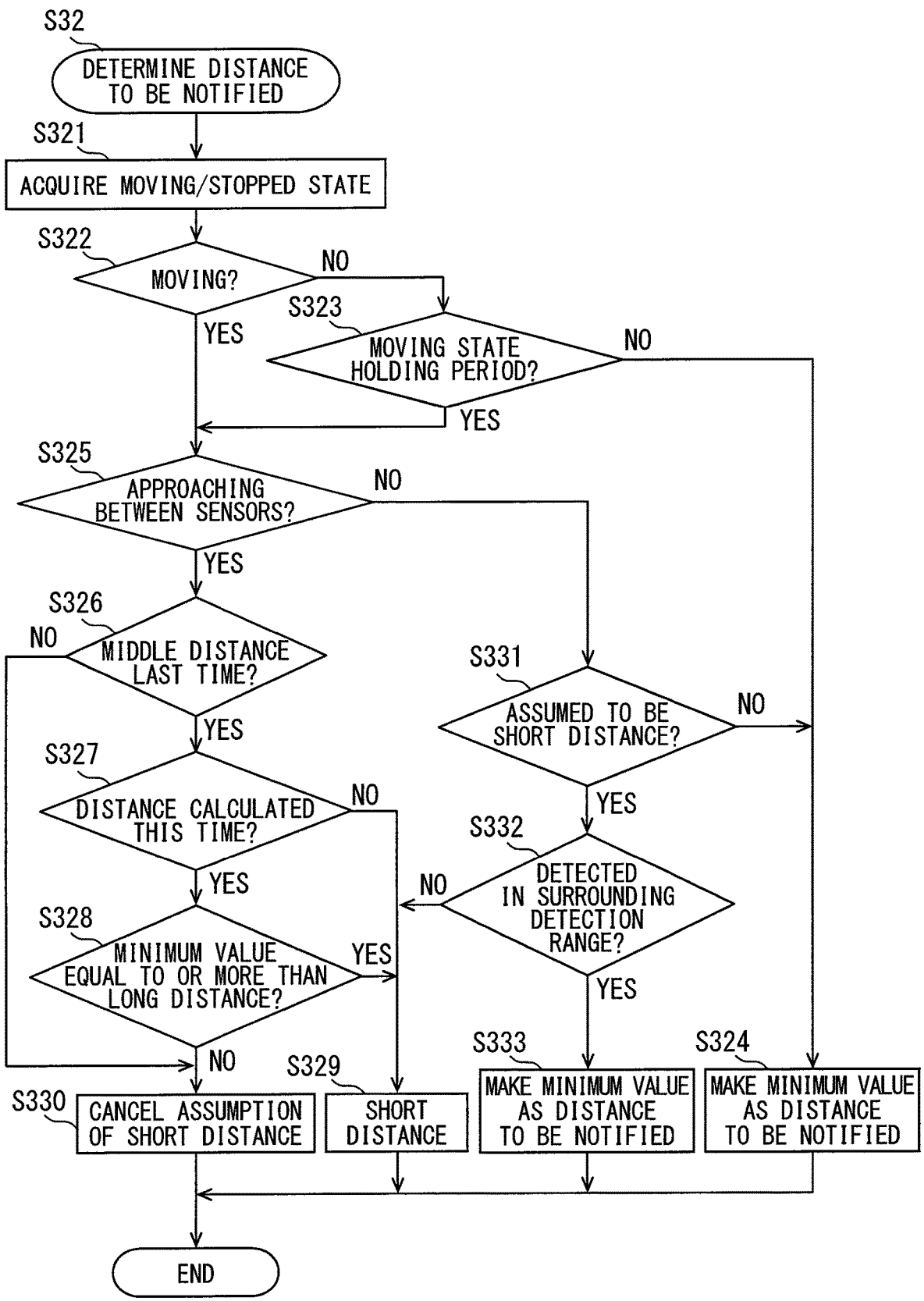
FIG. 6 is a flowchart showing the process in FIG. 4 of determining a distance to be notified in detail.

In FIG. 6, at step S321, the information indicating the moving/stopped state of the vehicle C is acquired from the vehicle state determinator 70 via the in-vehicle LAN 60. This step S321 is executed by the moving/stopped state acquisition device 27. The steps after that in FIG. 6 are executed by the distance determinator 28.

At step S322 that follows, it is determined whether the vehicle C is moving or at a standstill, based on the moving/stopped state acquired at step S321. If the vehicle is determined to be at a standstill (S322: NO), the process goes to step S323, while, if it is determined to be moving (S322: YES), the process goes to step S325.

At step S323, it is determined whether it is within a preset moving state holding period, after the moving/stopped state changed to "stopped". This moving state holding period is provided in consideration of the determination accuracy of the moving/stopped state. Namely, when the obstacle detection condition is established, the vehicle speed is often very low, and when the speed is very low, the accuracy of determining the moving/stopped state is generally low. This may cause unstable control because of switching between moving and stopped in a short time.

The moving state holding period may be suitably set based on an experiment to about several seconds to ten seconds, for example. This moving state holding period corresponds to the claimed preset period. When it is determined to be within the moving state holding period (S323: YES), the process goes to step S325, as with when it is determined to be moving at step S322, whereas, when it is determined to be not within the moving state holding period (S323: NO), the process goes to step S324.

At step S324, the minimum value of the detected distances calculated for the notification area for which a distance to be notified is being determined is made the distance to be notified.

At step S325, it is determined whether the obstacle is approaching between the two ultrasonic sensors 10 associated with the indirect wave distance corresponding to the notification area. This determination is made based on the approach state determined at step S308 in FIG. 5. If the determination at step S325 is NO, the process goes to step S331, whereas, if YES, the process goes to step S326.

At step S326, it is determined whether the minimum value of the indirect wave distances previously calculated for the notification area was a middle distance. The middle distance is a distance at which the presence of the obstacle is to be notified with a middle distance notification graphic 42b, 43b, 44b, 45b, 46b, or 47b. In the present embodiment, the range of distances to be notified as a middle distance is the predetermined distance range.

The short distance is a distance at which the presence of the obstacle is to be notified with a short distance notification graphic 42a, 43a, 44a, 45a, 46a, or 47a. The long distance is a distance at which the presence of the obstacle is to be notified with a long distance notification graphic 42c, 43c, 44c, 45c, 46c, or 47c, and the longest distance is a distance at which the presence of the obstacle is to be notified with a longest distance notification graphic 43d or 46d.

If the previous notified distance is not a middle distance (S326: NO), the process goes to step S330. The process of step S330 is similar to that of step S324, i.e., the minimum value of the detected distances calculated for the notification area for which a distance to be notified is being determined is made the distance to be notified.

Figure 9:
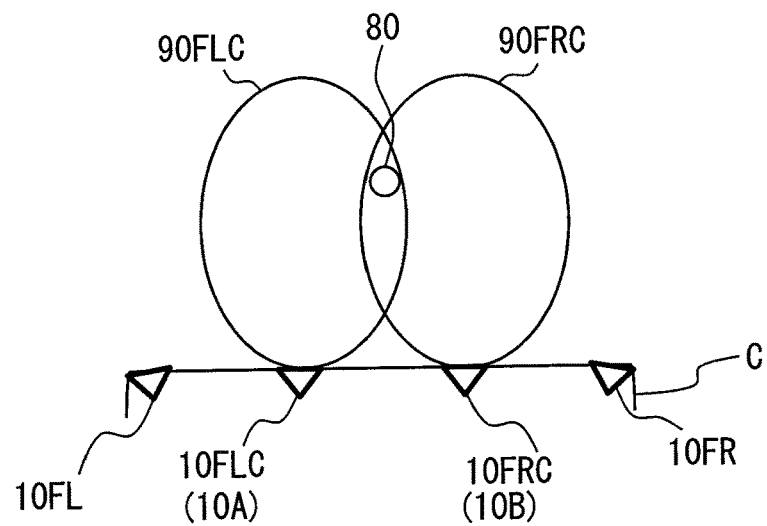
FIG. 9 is a diagram showing an example of a position of an obstacle relative to a vehicle.
Figure 10:
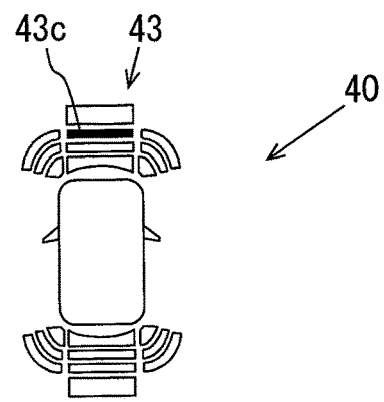
FIG. 10 is a diagram showing an obstacle position notification image when the obstacle is at the position of FIG. 9.

For example, assume that the obstacle 80 present at the position shown in FIG. 9 is located within an overlapping area of the obstacle detection ranges 90FLC and 90FRC of the ultrasonic sensors 10FLC and 10FRC. In addition, assume that the minimum value of the detected distances calculated by the ultrasonic sensors 10FLC and 10FRC is a value classified as a long distance. In this case, at the process of step S34 to be described later, the long distance notification graphic 43c of the center front notification area graphic 43 will be illuminated in the obstacle position notification image 40 as shown in FIG. 10.

When the previous notified distance is a middle distance and when the determination at step S326 is YES, the process goes to step S327. At step S327, it is determined whether an indirect wave distance has been calculated this time. If an indirect wave distance has been calculated, the process goes to step S328.

At step S328, it is determined whether the minimum value of the indirect wave distances calculated for the notification area is not less than a long distance. If this determination is NO, the process goes to step S330. Thus, step S330 will be executed also when the minimum value of the detected distances calculated for the notification area is classified as a middle distance.

Figure 11:
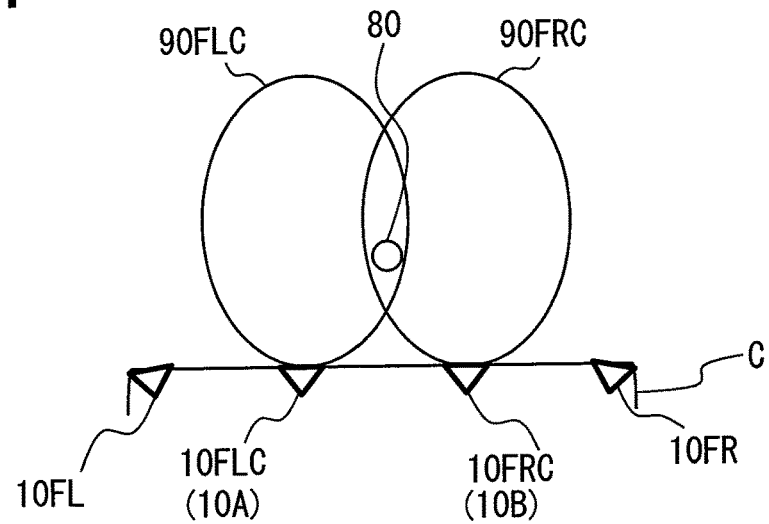
FIG. 11 is a diagram showing an example of a position of an obstacle relative to a vehicle.
Figure 12:
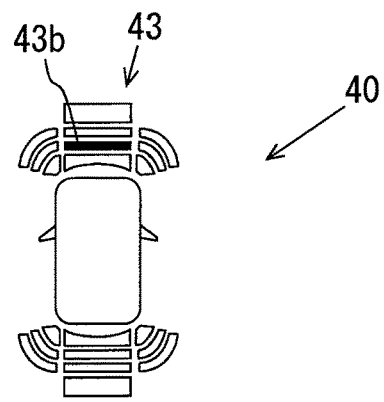
FIG. 12 is a diagram showing an obstacle position notification image when the obstacle is at the position of FIG. 11.

For example, when the vehicle C advances toward the obstacle 80 from the state shown in FIG. 9 so that the vehicle C and the obstacle 80 are positioned relative to each other as shown in FIG. 11, and if the distance from the vehicle C to the obstacle 80 at this time is a middle distance, then the determination at step S328 will be NO. FIG. 12 shows an example display of the obstacle position notification image 40 in the state of FIG. 11, where the middle distance notification graphic 43b of the center front notification area graphic 43 is illuminated.

When the determination at step S327 is NO, or when the determination at step S328 is YES, the process goes to step S329. At step S329, the distance to the obstacle is determined as a short distance. Thus, in both cases when an indirect wave distance has not been calculated (S327: NO), and when the minimum value of the detected distances is a long distance (S328: YES), the distance to the obstacle is determined as a short distance.

The reason for this is as follows. If the determination at step S325 is YES, it means that the obstacle is approaching the vehicle C between the two ultrasonic sensors 10 associated with the indirect wave distance corresponding to the notification area. If the previous notified distance is a middle distance (S326: YES), it is highly likely that the obstacle has come even closer to the vehicle C than the time of the previous notification.

Figure 13:
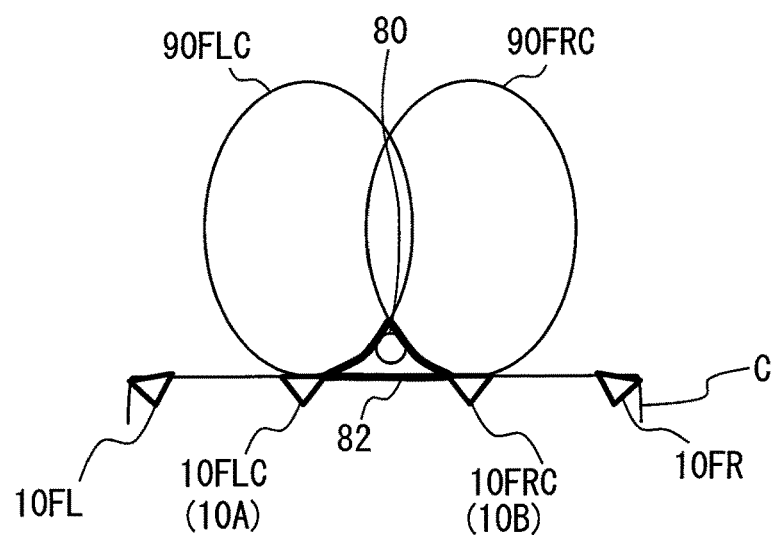
FIG. 13 is a diagram showing an example of a position of an obstacle relative to a vehicle.

There is an undetectable range where no obstacles can be detected near the sensor placement surface of the vehicle C and between ultrasonic sensors 10. FIG. 13 shows an undetectable range 82 present between the ultrasonic sensors 10FLC and 10FRC. This undetectable range 82 is a gap between the ultrasonic wave irradiation ranges of the ultrasonic sensors 10FLC and 10FRC.

Figure 14:
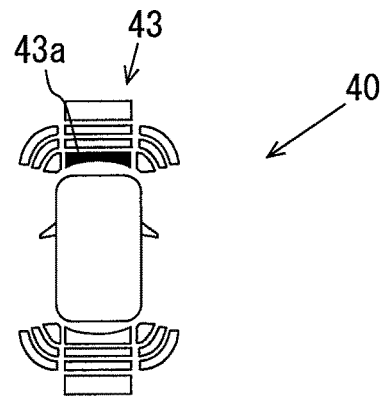
FIG. 14 is a diagram showing an obstacle position notification image when the obstacle is at the position of FIG. 13.

When there was an obstacle in a middle distance which would very likely have come closer to the vehicle C, and when no indirect wave distance has been calculated, it is reasonable to assume that the obstacle 80 has entered the undetectable range 82 as shown in FIG. 13. This is why step S329 is executed. In this case, in the process of step S34 to be described later, the short distance notification graphic 43a of the center front notification area graphic 43 is illuminated as shown in FIG. 14.

In addition, when there was an obstacle in a middle distance which would very likely have come closer to the vehicle C, the minimum value of the detected distances cannot indicate a long distance. If the minimum value of the detected distances nevertheless indicates a long distance, it can be assumed that the obstacle previously detected has entered the undetectable range and now is undetectable, and that another obstacle located farther away than the undetectable obstacle is now being detected. This is why step S329 is executed even when the determination at step S328 is YES.

As described above, at step S329, it is assumed that the distance to the obstacle is a short distance when it can be determined from the transitions in the position of the obstacle so far that the obstacle has entered a short distance range. Whether or not this assumption is to be canceled is determined through the process from step S331 onwards.

At step S331, it is determined whether the distance to the obstacle is being assumed to be a short distance. If this determination is NO, the process goes to the previously described step S324, whereas, if YES, the process goes to step S332.

At step S332, it is determined whether the obstacle has been detected in surrounding detection ranges around the short distance range where the obstacle is assumed to be. Examples of surrounding detection ranges around the short distance range of the center front notification area are the middle distance range of the center front notification area, the short distance range of the left front notification area, and the short distance range of the right front notification area. The middle distance range of the left front notification area, and the middle distance range of the right front notification area may further be added.

If the determination at step S332 is YES, the process goes to step S333. If the determination at step S332 is YES, it can be assumed that the obstacle that was present in the short distance has moved. At step S333, the assumption that the obstacle is present in the short distance is canceled, and the minimum value of the detected distances calculated for the notification area for which a distance to be notified is being determined is made the distance to be notified.

When one of steps S324, S329, S330, and S333 has been executed, the process goes to step S34 of FIG. 4. At step S34, the driver is notified of the distance that was determined by executing one of steps S324, S329, S330, and S333 with the use of the obstacle position notification image 40.

At step S36, the ultrasonic sensor 10 that is to transmit a wave is switched to a next ultrasonic sensor 10. The process from step S20 and the following steps is executed to the next ultrasonic sensor 10. When all of the four ultrasonic sensors 10 on the front end face have transmitted a wave, the next ultrasonic sensor 10 is the ultrasonic sensor 10 that is to transmit a wave first of these four ultrasonic sensors 10. Similarly, when all of the four ultrasonic sensors 10 on the end face have transmitted a wave, the next ultrasonic sensor 10 is the ultrasonic sensor 10 that is to transmit a wave first of these four ultrasonic sensors 10.

(Effects of the Embodiment)

In the embodiment described above, it is determined, based on the distance difference calculated at step S304 and on the amount of change calculated at step S306, whether the obstacle is between the two ultrasonic sensor 10 associated with the indirect wave distance and whether the obstacle is approaching the vehicle C (S308). In the following description, of the two ultrasonic sensors 10 associated with the indirect wave distance, the ultrasonic sensor that transmits the wave will be referred to as the first ultrasonic sensor 10A, and the ultrasonic sensor that receives the wave will be referred to as the first ultrasonic sensor 10B. In the example shown in FIG. 9, FIG. 11, and FIG. 13, assume that the first ultrasonic sensor 10A is the ultrasonic sensor 10FLC, and the second ultrasonic sensor 10B is the ultrasonic sensor 10FRC. These first ultrasonic sensor 10A and second ultrasonic sensor 10B correspond to the first probe wave sensor and the second probe wave sensor, respectively. It can be that, conversely, the ultrasonic sensor 10FRC is the first ultrasonic sensor 10A and the ultrasonic sensor 10FLC is the second ultrasonic sensor 10B. Other ultrasonic sensors 10 can also be the first ultrasonic sensor 10A when they acquire a transmission instruction signal, or the second ultrasonic sensor 10B when they acquire a reception instruction signal.

The amount of change calculated at step S306 is an amount of change in the indirect wave distance. This is because indirect waves are very likely being reflected by the obstacle between the first ultrasonic sensor 10A and the second ultrasonic sensor 10B. In addition, as shown in FIG. 9, FIG. 11, and FIG. 13, the distance difference is smaller when the obstacle 80 is located between the first and second ultrasonic sensors 10A and 10B than when the obstacle 80 is not located between the first and second ultrasonic sensors 10A and 10B.

Therefore, by using the distance difference calculated at step S304 and the amount of change calculated at step S306, it can be determined accurately whether the obstacle is between the first ultrasonic sensor 10A and the second ultrasonic sensor 10B and whether the obstacle is approaching the vehicle C.

Provided that the obstacle is between the first ultrasonic sensor 10A and the second ultrasonic sensor 10B and approaching the vehicle C (S325: YES), if this obstacle becomes undetectable (S327: YES), it can be considered that this obstacle has moved into the undetectable range 82 between the first ultrasonic sensor 10A and the second ultrasonic sensor 10B as shown in FIG. 13.

If the obstacle is approaching the vehicle C, the indirect wave distance cannot become longer than the previously determined distance. With the determination at step S325 being YES, when the distance to be notified that was a middle distance previously (S326: YES) has become a long distance (S328: YES), it can be assumed that the obstacle that was detectable has moved into the undetectable range 82 between the first ultrasonic sensor 10A and the second ultrasonic sensor 10B and is now undetectable, and there is another obstacle being detected.

Accordingly, if NO at step S327 or YES at step S328, the distance to be notified is changed from the previous middle distance to a short distance closer to the vehicle C (S329). This way, the distance to be notified can be determined even when the obstacle 80 is present in the undetectable range 82 near the sensor placement surface.

The assumption that an obstacle is present in a short distance (S329) and the canceling thereof (S333) are not necessarily made with 100% accuracy. Therefore, if the vehicle C is not moving (S322: NO) and if it is not during the moving state holding period (S323: NO), then the distance to be notified is not assumed to be a short distance. This is because, if the vehicle C is not moving (S322: NO) and if it is not during the moving state holding period, the necessity to assume that there is an obstacle in a short distance is low.

This way, the possibility of assuming that there is an obstacle in a short distance when there is no obstacle in the short distance, or the possibility of continuing to assume that the obstacle is still in the short distance when the obstacle is no longer in the short distance, is reduced.

While one embodiment of the present disclosure has been described above, the present disclosure is not limited to the embodiment described above and its technical scope includes the following variations. The disclosure can be embodied with various changes other than those described below without departing from the scope of the subject matter. In the following description, the elements given the same reference numerals as those that have been used before are, unless otherwise specified, the same as the elements with the same reference numerals in the preceding embodiment. Where only some features of a configuration are explained, the previously described embodiment can be applied to other features of the configuration.

<Variation 1>

Figure 15:
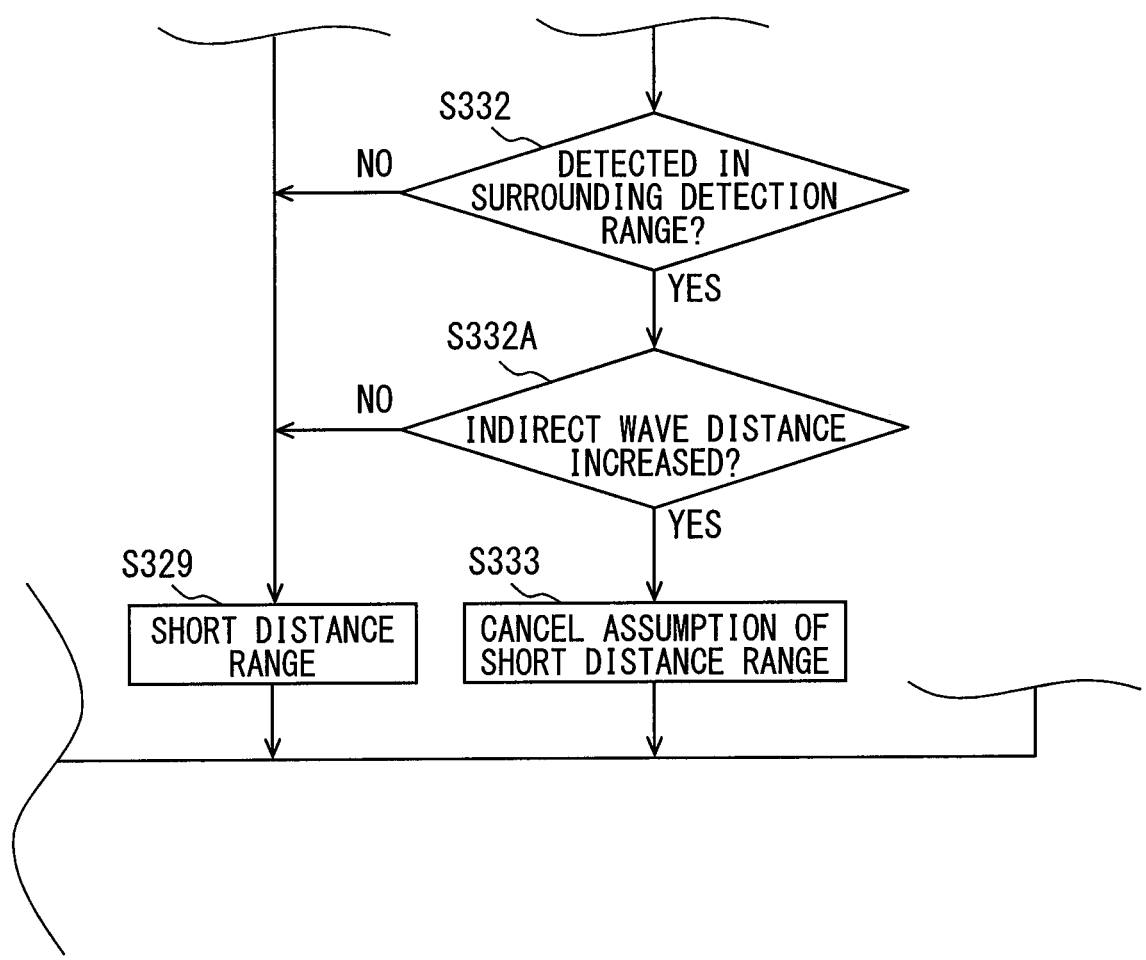
FIG. 15 is a flowchart showing part of a process of determining the distance to be notified in Variation 1.

As shown in FIG. 15, when the determination at step S332 is YES, step S332A may be executed. At step S332A, it is determined whether the indirect wave distance has increased. When step S332A is executed, the obstacle has already been detected in a surrounding detection range, and the indirect wave distance has likely been calculated, too. For the determination of whether the indirect wave distance has increased, the current indirect wave distance and the latest indirect wave distance determined before the execution of step S329 are used. If the indirect wave distance has already been calculated a number of times after step S332 where the determination was YES, the previous indirect wave distance obtained after the YES determination at step S332 may be used instead of the indirect wave distance detected immediately before the execution of step S329.

If the determination at step S332A is YES, the process goes to step S333, whereas, if NO, the process goes to step S329. At the time point when it was determined that the obstacle was detected in a surrounding detection range (S332: YES), it is still possible that the obstacle is not located at a point where it is consistently detectable by the ultrasonic sensor 10, because the obstacle had been located in an undetectable range immediately before that. If the assumption that the obstacle is present in a short distance is canceled based only on the determination at step S332, the range in which the obstacle is present may soon be assumed again to be a short distance if the obstacle becomes undetectable again immediately thereafter. Namely, the notification control may become inconsistent, i.e., the notification level may vary within a short period of time.

In Variation 1, when it is determined that the obstacle was detected in a surrounding detection range (S332: YES), and when it is determined that the indirect wave distance has increased (S332A: YES), the assumption that the obstacle is present in a short distance is canceled (S333). If the indirect wave distance is increasing, it is considered that the obstacle is located at a point where it is consistently detectable by the ultrasonic sensor 10. Thus, with Variation 1, the notification control is made consistent.

<Variations 2 and 3>

In the previously described embodiment, the notification to the passenger of the vehicle C of the presence of an obstacle is controlled based on the distance from the vehicle C to the obstacle. Instead of, or in addition to the notification control, other driver assistance control functions such as automatic brake control may be performed (Variation 2).

Instead of the notification control with the use of the display device 30, or in addition to the notification control with the use of the display device 30, sound may be used to notify the presence of an obstacle (Variation 3).

<Variation 4>

In the above described embodiment, if the determination at step S327 is YES, or if the determination at step S328 is YES, then the distance to the obstacle is changed to a short distance shorter than the previous middle distance. Instead, when the determination at step S327 is YES, or when the determination at step S328 is YES, the distance to the obstacle may be maintained to be the middle distance. The distance to the obstacle can also be determined this way to continue the driver assistance control.

<Variation 5>

In the above described embodiment, step S327 is executed only when the previously determined distance to be notified is a middle distance. Instead, step S328 may be executed also when the previously determined distance to be notified is a short distance.

<Variation 6>

In Variation 5, a middle distance may be added in the determination at step S328.

<Variation 7>

In the above described embodiment, the ultrasonic sensor 10 includes the distance calculator 15. Namely, the direct wave distance and indirect wave distance are determined by the ultrasonic sensor 10 in the above described embodiment. These direct wave distance and indirect wave distance may be calculated by the ECU 20.

If the direct wave distance and indirect wave distance are to be calculated by the ECU 20, the ultrasonic sensor 10 performs calculations to produce the above described time interval, and transmits this time interval to the ECU 20. The ECU 20 multiplies the time interval by the speed of sound and divides it by two to produce the direct wave distance or indirect wave distance.

Alternatively, the time interval may also be calculated by the ECU 20. In this case, the ultrasonic sensor 10 transmits, to the ECU 20, a signal indicating that a reflection wave with an intensity of not less than an object detection threshold has been received. The time point at which the transceiver 11 of the ultrasonic sensor 10 transmits a wave may be either the time point when that ultrasonic sensor 10 notifies the ECU of the transmission of the transmission wave, or the time point when the ECU 20 outputs a transmission instruction signal to the ultrasonic sensor 10.

It is noted that a flowchart or the processing of the flowchart in the present application includes sections (also referred to as steps), each of which is represented, for instance, as S2. Further, each section can be divided into several sub-sections while several sections can be combined into a single section. Furthermore, each of thus configured sections can be also referred to as a device, module, or means.

While the present disclosure has been described with reference to embodiments thereof, it is to be understood that the disclosure is not limited to the embodiments and constructions. The present disclosure is intended to cover various modification and equivalent arrangements. In addition, the various combinations and configurations, other combinations and configurations, including more, less or only a single element, are also within the spirit and scope of the present disclosure.

The invention claimed is:

1. An obstacle detection apparatus for vehicles, the obstacle detection apparatus mounted to a vehicle and comprising:
a first probe wave sensor that is arranged at a predetermined part of a placement surface of the vehicle, and that has a detectable range to detect a direct wave distance as a distance to an obstacle by transmitting a probe wave and receiving a reflection wave of the probe wave reflected by the obstacle;
a second probe wave sensor that is arranged at a position of the vehicle where the second probe wave sensor receives the reflection wave, and that has a detectable range to detect a distance to the obstacle by receiving the reflection wave;
a distance difference calculator that calculates a distance difference between a direct wave distance detected by the first probe wave sensor and an indirect wave distance detected by the second probe wave sensor;
a change amount calculator that calculates an amount of change in the indirect wave distance;
an approach determinator that determines whether the obstacle is present in an undetectable range, which is a region between the placement surface and an overlapping region of the detectable range of the first probe wave sensor and the detectable range of the second probe wave sensor, based on a determination of
whether the distance difference is smaller than or equal to a predetermined threshold value, and
whether the indirect distance is decreasing based on the amount of change in the indirect wave distance; and
a distance determinator that sets an obstacle distance for a driver assistance control to be less than or equal to a predetermined distance range based on the indirect wave distance being outside of the predetermined distance range, in response to the approach determinator determining that the obstacle is approaching the undetectable range in a condition that
(i) the distance difference is smaller than or equal to the predetermined threshold value, and
(ii) the distance difference is decreasing based on the amount of change in the indirect wave distance,
wherein the direct wave distance is a distance from the first probe wave sensor to the obstacle, and is detected by the first probe wave sensor,
wherein the indirect wave distance is a half of a sum of the distance from the first probe wave sensor to the obstacle and a distance from the obstacle to the second probe wave sensor, and is detected by the second probe wave sensor, and
wherein the undetectable range is a range in which the indirect wave distance and the direct wave distance cannot be detected.

2. The obstacle detection apparatus for vehicles according to claim 1,
wherein the distance determinator determines the obstacle distance to be within a short distance range closer to the vehicle than the predetermined distance range based on the indirect wave distance being outside of the predetermined distance range, in a case where the approach determinator determines that the obstacle is present between the first probe wave sensor and the second probe wave sensor and the obstacle is approaching the vehicle.

3. The obstacle detection apparatus for vehicles according to claim 1,
wherein the distance determinator determines the obstacle distance to be less than or equal to the predetermined distance range based on the indirect wave distance being outside of the predetermined distance range and based on the vehicle moving, in a case where the approach determinator determines that the obstacle is present between the first probe wave sensor and the second probe wave sensor and the obstacle is approaching the vehicle.

4. The obstacle detection apparatus for vehicles according to claim 3, further comprising:
a moving/stopped state acquisition device that acquires information indicative of whether a moving/stopped state of the vehicle is a moving state or a stopped state,
wherein the distance determinator determines that the vehicle is moving for a preset period of time, based on the information indicative of whether the moving/ stopped state acquired by the moving/stopped state acquisition device indicates a change from the moving state to the stopped state.

5. The obstacle detection apparatus for vehicles according to claim 2,
wherein, based on the obstacle being detected in a detection area around the short distance range after the obstacle distance after determined as being within the short distance range, the distance determinator determines the obstacle distance to be a distance, which is defined based on the direct wave distance and the indirect wave distance.

6. The obstacle detection apparatus for vehicles according to claim 5,
wherein, based on the obstacle being detected in a detection area around the short distance range and based on the indirect wave distance increasing after the obstacle distance is determined as being within the short distance range, the distance determinator determines the obstacle distance to be a distance, which is defined based on the direct wave distance and the indirect wave distance.

7. The obstacle detection apparatus for vehicles according to claim 1,
wherein the approach determinator determines, based on the distance difference calculated by the distance difference calculator and the amount of change calculated by the change amount calculator, whether the obstacle is present between the first probe wave sensor and the second probe wave sensor and whether the obstacle is approaching the vehicle.

8. The obstacle detection apparatus for vehicles according to claim 7,
wherein, in a case where the distance difference is not calculated because the direct wave distance is not calculated, the approach determinator determines, based on the amount of change calculated by the change amount calculator, whether the obstacle is present between the first probe wave sensor and the second probe wave sensor and whether the obstacle is approaching the vehicle, based on the distance difference not being calculated and the indirect wave distance being calculated.

9. The obstacle detection apparatus for vehicles according to claim 1,
wherein the first probe wave sensor and the second probe wave sensor are arranged at a central part in a vehicle width direction on an end face in a front-back direction of the vehicle.

10. The obstacle detection apparatus for vehicles according to claim 1,
wherein, in response to a line parallel to an advancing direction of the vehicle and passing the first probe wave sensor being defined as a first line, and a line parallel to the advancing direction of the vehicle and passing the second probe wave sensor being defined as a second line, the approach determinator determines, based on the indirect wave distance, whether the obstacle is present between the first line and the second line and whether the obstacle is approaching the vehicle.

11. The obstacle detection apparatus for vehicles according to claim 2,
wherein the short distance range includes an undetectable range where the obstacle is undetectable.

12. An obstacle detection apparatus for vehicles, the obstacle detection apparatus mounted to a vehicle and comprising:
a first probe wave sensor configured to detect a direct wave distance to an obstacle by transmitting a probe wave and receiving a reflection wave of the probe wave that is reflected by the obstacle;
a second probe wave sensor configured to receive the reflection wave and detect a distance to the obstacle by receiving the reflection wave;
a distance difference calculator that calculates a distance difference between a direct wave distance detected by the first probe wave sensor and an indirect wave distance detected by the second probe wave sensor;
a change amount calculator that calculates an amount of change in the indirect wave distance;
an approach determiner that determines whether the obstacle is approaching an undetectable range based on a determination of
whether the direct wave distance is detected,
whether the distance difference is smaller than or equal to a predetermined threshold value, the undetectable range comprising a gap within which the direct wave distance and the indirect wave distance cannot be detected, the gap defined by the vehicle and obstacle detection ranges of the first probe wave sensor and the second probe wave sensor, and
whether the indirect distance is decreasing based on the amount of change in the indirect wave distance; and
a distance determiner that sets an obstacle distance for a driver assistance control to be less than or equal to a predetermined distance range in response to the approach determiner determining that the obstacle is approaching the undetectable range in a condition that
(i) the distance difference is smaller than or equal to the predetermined threshold value, and
(ii) the distance difference is decreasing based on the amount of change in the indirect wave distance, and
(iii) despite the indirect wave distance to the obstacle being determined to be greater than the predetermined distance range,
wherein the direct wave distance is a distance from the first probe wave sensor to the obstacle, and is detected by the first probe wave sensor, and
wherein the indirect wave distance is a half of a sum of the distance from the first probe wave sensor to the obstacle and a distance from the obstacle to the second probe wave sensor, and is detected by the second probe wave sensor.

* * * * *